US010789242B2

(12) United States Patent
Cho et al.

(10) Patent No.: US 10,789,242 B2
(45) Date of Patent: Sep. 29, 2020

(54) MANAGING MATERIALIZED VIEWS IN EVENTUALLY CONSISTENT DISTRIBUTED DATA STORES

(71) Applicant: Microsoft Technology Licensing, LLC, Redmond, WA (US)

(72) Inventors: SungJu Cho, Cupertino, CA (US); Roman A. Averbukh, Sunnyvale, CA (US); Yanwei Zhang, Hillsboro, OR (US); Andrew J. Carter, Mountain View, CA (US); Jane Alam Jan, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 15/962,896

(22) Filed: Apr. 25, 2018

(65) Prior Publication Data

US 2019/0332698 A1    Oct. 31, 2019

(51) Int. Cl.
*G06F 16/23* (2019.01)
*G06F 16/2455* (2019.01)
*G06F 16/901* (2019.01)

(52) U.S. Cl.
CPC ...... *G06F 16/2365* (2019.01); *G06F 16/2393* (2019.01); *G06F 16/2456* (2019.01); *G06F 16/24565* (2019.01); *G06F 16/9024* (2019.01)

(58) Field of Classification Search
CPC ............. G06F 16/2365; G06F 16/2393; G06F 16/2456; G06F 16/24565; G06F 16/9024
See application file for complete search history.

(56) References Cited

U.S. PATENT DOCUMENTS

| 2005/0091180 | A1* | 4/2005 | Peleg | G06F 16/2393 |
| 2005/0192922 | A1* | 9/2005 | Edlund | G06F 16/24552 |
| 2005/0235001 | A1* | 10/2005 | Peleg | G06F 16/2393 |
| 2006/0047696 | A1* | 3/2006 | Larson | G06F 16/2393 |
| 2013/0007069 | A1* | 1/2013 | Chaliparambil | G06Q 10/10 707/803 |
| 2014/0181081 | A1* | 6/2014 | Veldhuizen | G06F 16/245 707/722 |
| 2014/0280029 | A1* | 9/2014 | Ding | G06F 16/24539 707/717 |

(Continued)

OTHER PUBLICATIONS

Cho, SungJu et al., "Partial Update: Efficient Materialized View Maintenance in a Distributed Graph Database", 2018 IEEE 34th Int'l Conf. on Data Engineering, pp. 1477-1488. (Year: 2018).*

(Continued)

*Primary Examiner* — Scott A Waldron
(74) *Attorney, Agent, or Firm* — Hickman Palermo Becker Bingham LLP (57) ABSTRACT

The disclosed embodiments provide a system for managing a materialized view of data in a data store. During operation, the system obtains a first creation time of a first materialized view of the data in the data store. Next, the system verifies that the first materialized view is not affected by deletions applied to the data since the first creation time. The system then identifies one or more additions to the data that are not included in the first materialized view. Finally, the system applies the additions to the first materialized view to maintain an eventual consistency of the first materialized view with the data store.

20 Claims, 6 Drawing Sheets

(56) References Cited

U.S. PATENT DOCUMENTS

2018/0150503 A1* 5/2018 Horii .................. G06F 11/3065

OTHER PUBLICATIONS

Cho et al.; "Partial Update: Efficient Materialized View Maintenance in a Distributed Graph Database", 2018 IEEE 34th International Conference on Data Engineering, 10.1109/ICDE.2018.00166, Apr. 16-19, 2018.

* cited by examiner

MANAGING MATERIALIZED VIEWS IN EVENTUALLY CONSISTENT DISTRIBUTED DATA STORES

RELATED APPLICATION

The subject matter of this application is related to the subject matter in a co-pending non-provisional application entitled "Index Structures for Graph Databases," having Ser. No. 15/058,028 and filing date 1 Mar. 2016.

BACKGROUND

Field

The disclosed embodiments relate to distributed data stores. More specifically, the disclosed embodiments relate to techniques for managing materialized views in eventually consistent distributed data stores.

Related Art

Online networks may include nodes representing individuals and/or organizations, along with links between pairs of nodes that represent different types and/or levels of social familiarity between the nodes. For example, two nodes in an online network may be connected as friends, acquaintances, family members, and/or professional contacts. Online networks may be tracked and/or maintained on web-based social networking services, such as online professional networks that allow the individuals and/or organizations to establish and maintain professional connections, list work and community experience, endorse and/or recommend one another, run advertising and marketing campaigns, promote products and/or services, and/or search and apply for jobs.

Online networks and/or online professional networks may further facilitate online business activities such as marketing, advertising, and/or recruiting by the individuals and/or organizations. For example, recruiters may use the online professional network to search for candidates for job opportunities and/or open positions. At the same time, job seekers may use the online professional network to enhance their professional reputations, conduct job searches, reach out to connections for job opportunities, and apply to job listings.

To fully leverage an online network, individuals and/or organizations may perform complex queries of the online network. For example, a graph database that stores nodes and edges representing members and connections in an online network may be queried for second-degree networks of the members (i.e., connections of the members' connections). Results of the queries may then be used to recommend potential connections to the members, generate statistics or metrics related to the second-degree networks (e.g., the size of a member's second-degree network, the number of first- or second-degree connections that studied at a school or worked at a company, etc.), identify connections in common for the purpose of introducing or connecting two members, and/or find a shortest path between two members.

However, complex querying of social and/or online professional network data may be time- and/or resource-intensive. For example, a query that finds possible paths between two nodes in the online professional network may require a scan of all links between individuals and/or organizations that can be used to form a path connecting the nodes, with the number of links to be scanned increasing exponentially with the number of hops in the path. At the same time, a materialized view that expedites query processing by caching complex query results such as second-degree connections may incur additional overhead associated with storing the cached results and/or maintaining the materialized view with respect to changes to the corresponding base relations from a source of truth.

Consequently, use of social and/or online professional networks may be facilitated by mechanisms for improving the performance and scalability of complex queries of social and/or online professional network data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

Figure 1:
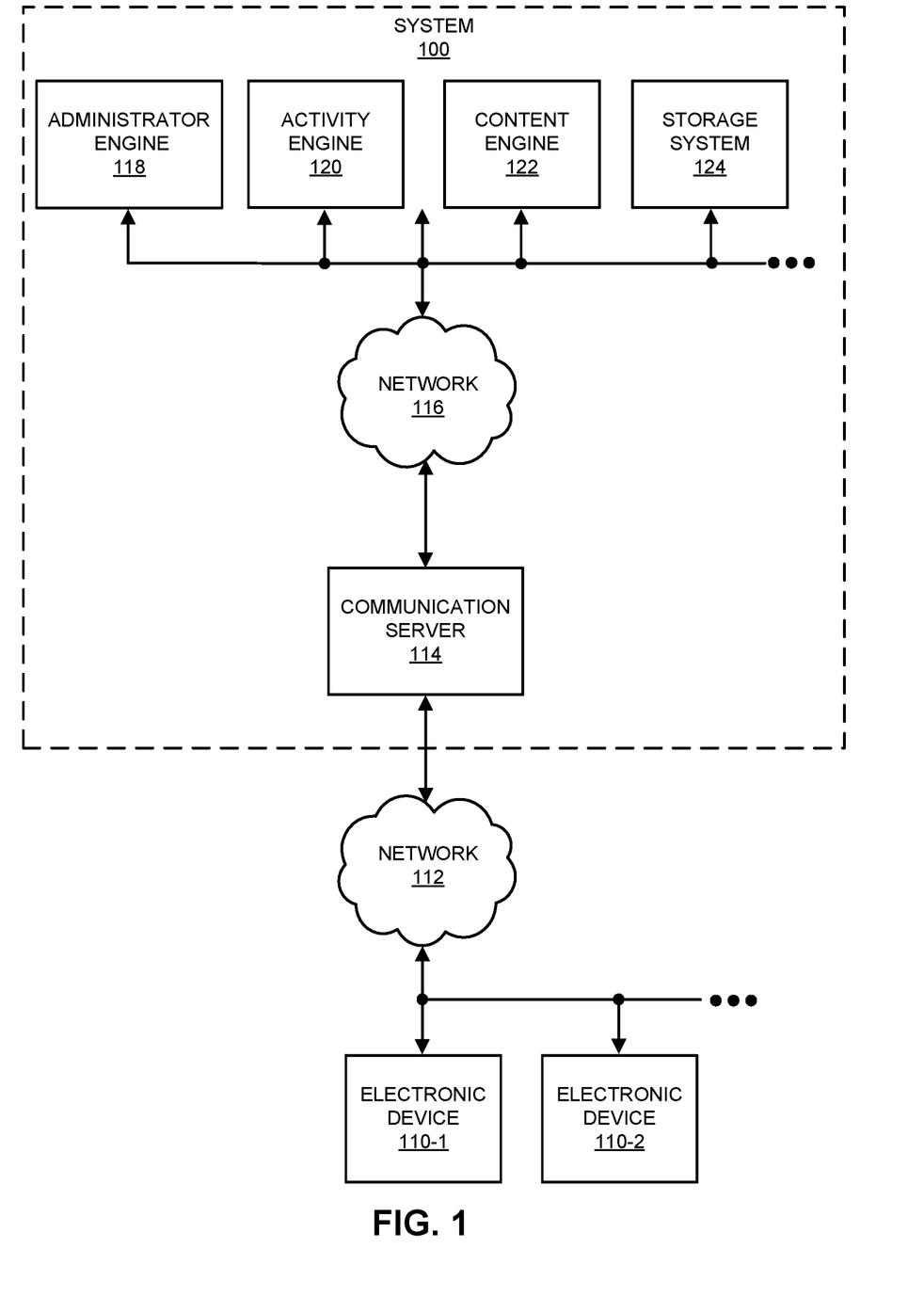
FIG. 1 shows a schematic of a system in accordance with the disclosed embodiments.

The disclosed embodiments provide a method, apparatus, and system for managing materialized views in eventually consistent distributed data stores. As shown in FIG. 1, a system 100 may provide a service such as a distributed graph database and/or other type of data store. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices (e.g., a large-scale distributed storage system).

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may lack access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

To address these problems, storage system 124 includes a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
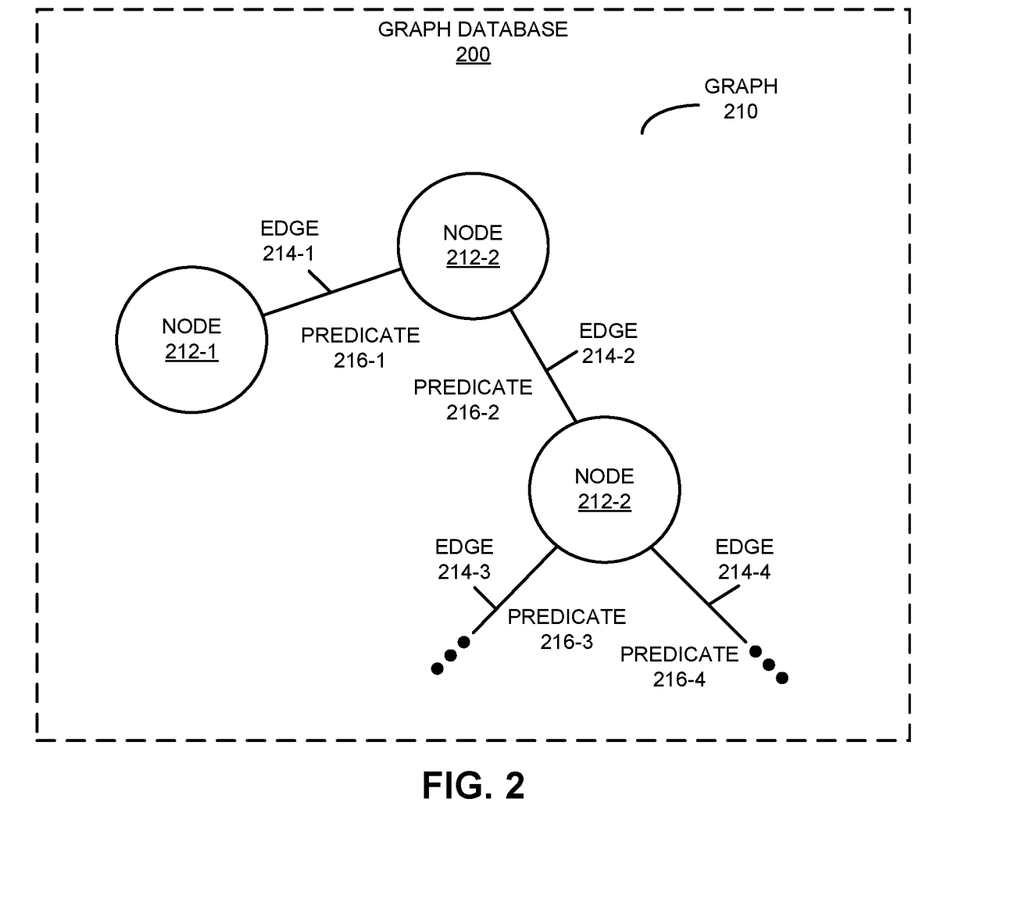
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, so that each node 212 in graph 210 includes a direct edge to its adjacent nodes without using an index lookup.

Note that graph database 200 may be an implementation of a relational model with constant-time navigation (i.e., independent of the size N), as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include methods that allow the data associated with the applications and/or the social network to be efficiently stored and retrieved from graph database 200. Such methods are described in U.S. Pat. No. 9,535,963 (issued 3 Jan. 2017), which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may provide technological improvements in the availability and the performance or functioning of the applications, the social network and system 100, which may reduce user frustration and which may improve the user experience. The graph-storage techniques may additionally increase engagement with or use of the social network, and thus may increase the revenue of a provider of the social network.

Note that information in system 100 may be stored at or distributed across one or more locations (i.e., locally and/or remotely). Moreover, because this data may be sensitive in nature, it may be encrypted. For example, stored data and/or data communicated via networks 112 and/or 116 may be encrypted.

Figure 3:
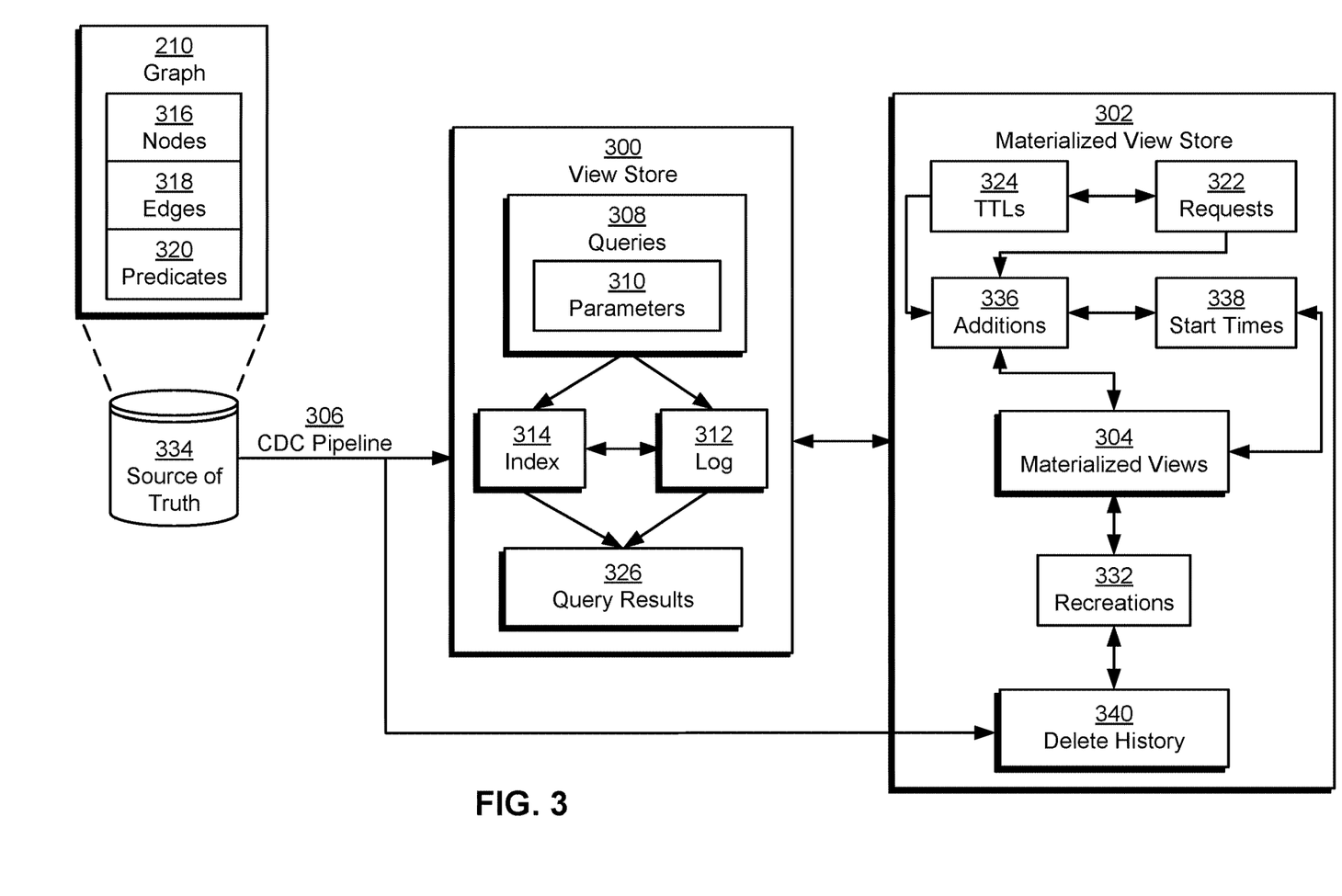
FIG. 3 shows a system for managing materialized views in an eventually consistent data store in accordance with the disclosed embodiments.

In one or more embodiments, graph database 200 includes functionality to provide incremental updates and eventual consistency in materialized views of graph database 200. As shown in FIG. 3, graph 210 is obtained from a source of truth 334 for a graph database (e.g., graph database 200 of FIG. 2). For example, graph 210 may be retrieved from a relational database, distributed filesystem, and/or other storage mechanism providing the source of truth.

As described above and in the above-referenced patent, graph 210 includes a set of nodes 316, a set of edges 318 between pairs of nodes, and a set of predicates 320 describing the nodes and/or edges. Each edge in the graph may be specified in a (subject, predicate, object) triple. For example, an edge denoting a connection between two members named "Alice" and "Bob" may be specified using the following statement:

Edge("Alice", "ConnectedTo", "Bob")

In the above statement, "Alice" is the subject, "Bob" is the object, and "ConnectedTo" is the predicate.

In turn, graph 210 is used to populate a view store 300 for processing queries 308 against graph 210. For example, view store 300 may provide an in-memory representation of graph 210 for efficient and/or flexible processing of read queries of nodes 316, edges 318, and predicates 320 that are written to source of truth 334.

More specifically, a representation of nodes 316, edges 318, and predicates 320 may be obtained from source of truth 334 and stored in a log 312 in the graph database. Lock-free access to graph database 200 may be implemented by appending changes to graph 210 to the end of the log instead of requiring modification of existing records in the source of truth. In turn, graph database 200 may provide an in-memory cache of log 312 and an index 314 for efficient and/or flexible querying of the graph.

In other words, nodes 316, edges 318, and predicates 320 may be stored as offsets in a log 312 that is read into memory in graph database 200. For example, the exemplary edge statement for creating a connection between two members named "Alice" and "Bob" may be stored in a binary log using the following format:

| | |
|---|---|
| 256 | Alice |
| 261 | Bob |
| 264 | ConnectedTo |
| 275 | (256, 264, 261) |

In the above format, each entry in the log is prefaced by a numeric (e.g., integer) offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")). Consequently, log 312 may be a representation of a key-value store, in which keys are unique offsets of entries in log 312 and values are nodes 316, edges 318, predicates 320, and/or other data stored at the offsets.

Because the ordering of changes to graph 210 is preserved in log 312, offsets in the log may be used as representations of virtual time in the graph. More specifically, each offset may represent a different virtual time in graph 210, and changes in the log up to the offset may be used to establish a state of graph 210 at the virtual time. For example, the sequence of changes from the beginning of log 312 up to a given offset that is greater than 0 may be applied, in the order in which the changes were written, to construct a representation of graph 210 at the virtual time represented by the offset.

The graph database may also include an in-memory index 314 that enables efficient lookup of edges 318 by subject, predicate, object, and/or other keys or parameters 310. Index structures for graph databases are described in a co-pending non-provisional application entitled "Index Structures for Graph Databases," having Ser. No. 15/058,028 and filing date 1 Mar. 2016, which is incorporated herein by reference.

In one or more embodiments, multiple instances of view store 300 are use to scale with the volume of graph database queries. For example, the graph database and/or view store 300 may be partitioned across multiple storage nodes in one or more clusters. The graph database may also include one or more instances of a client node providing an application-programming interface (API) that allows applications, services, and/or other components to retrieve social network data stored in the graph database. Each client node may receive queries 308 of a graph database through the API and process queries 308 by issuing requests for data associated with queries 308 to the storage nodes. The client node may then receive data in response to the request from the storage nodes and generate responses to queries 308 based on the received data (e.g., after performing additional analysis, aggregation, unioning, joining, filtering, and/or other operations on the received data).

To further expedite processing of queries 308, a materialized view store 302 is used to cache certain query results 326 and/or sub-query results (e.g., sub-graphs used to generate query results 326) from view store 300. For example, one or more instances of materialized view store 302 may provide a caching service that generates and/or stores materialized views 304 containing second-degree networks of social network members represented by nodes 316 in graph 210 and/or other query results 326 related to complex queries 308 of the graph database. Within materialized view store 302, materialized views 304 may be stored in an in-memory least-recently-used (LRU) cache and/or a secondary disk-based cache.

Each second-degree network may be stored as two sets of sorted integers: a first set representing a member's first-degree connections, and a second set representing the member's second-degree connections (i.e., first-degree connections of the member's first-degree connections). The second-degree connections may be a type of select-project-join (SPJ) view, which is produced by selecting identifiers of the member's second-degree connections after projecting and self-joining on relations in the first- and second-degree connections.

The caching service may also provide specialized services related to calculating a member's second-degree network, calculating the size of the member's second-degree network, using cached network data to find paths between pairs of members in the social network, and/or using cached network data to calculate the number of hops between the pairs of members. The caching service may thus expedite processing of complex queries 308 involving distance badging (e.g., computing, up to three hops, the distance between a source node and one or more destination nodes 316), path finding, common entity computation (e.g., determining if two nodes 316 have common connections, schools, companies, and/or influencers), and/or network size calculation (e.g., calculating the size of a node's second-degree network).

To improve performance, availability, and/or throughput associated with processing queries 308 of the graph database, the system of FIG. 3 may use an eventual consistency model to replicate changes from source of truth 334 to view store 300 and materialized view store 302. In particular, a change data capture (CDC) pipeline 306 may propagate changes to nodes 316, edges 318, predicates 320, and/or other data in graph 210 from source of truth 334 to various instances of view store 300 and/or materialized view store 302.

For example, CDC pipeline 306 may be implemented using a distributed streaming platform such as Apache Kafka (Kafka™ is a registered trademark of the Apache Software Foundation). As a result, changes to different subsets of data in source of truth 334 may be transmitted to view store 300 and/or materialized view store 302 via different Kafka topics and/or partitions. In another example, CDC pipeline 306 may be provided by a source-agnostic CDC system that fetches committed changes from a transaction or commit log on source of truth 334, stores the changes in a high-performance log store, and provides the changes to view store 300, materialized view store 302, and/or other consumers of the changes.

In both examples, changes to data in source of truth 334 may be reflected in view store 300 after a number of milliseconds to seconds. In other words, view store 300 may be updated with a change to data in source of truth 334 as soon as the change is received over CDC pipeline 306 and applied to log 312, index 314, and/or other components storing the data in view store 300.

On the other hand, the same changes may be reflected in materialized view store 302 based on times to live (TTLs) 324 of the corresponding materialized views 304. When materialized view store 302 encounters a cache miss, materialized view store 304 materializes the corresponding query results (e.g., query results 326 from view store 300) in a new materialized view and assigns, to the new materialized view, a TTL that ranges from a number of seconds to a number of minutes. While the TTL has not lapsed, the materialized view may be used to serve potentially stale data in response to the corresponding queries 308. After the TTL has lapsed, recreation (e.g., recreations 332) of the materialized view may be performed using more up-to-date data in view store 300. For example, view store 300 may be queried for the latest version of data in the materialized view, and stale data in the materialized view may be replaced with the latest version from view store 300. Alternatively, data in the materialized view may be retained, and an "incremental maintenance" technique may be used to ensure that the materialized view is eventually consistent with view store 300 and/or source of truth.

More specifically, the system of FIG. 3 performs incremental maintenance by applying, to materialized views 304, recent changes to the corresponding data from source of truth 334 and/or view store 300 instead of recreating materialized views 304 using complex and/or computationally expensive queries 308 of view store 300. For example, materialized view store 302 may update a materialized view of a second-degree network of a member represented by a node in graph 210 with changes made to the second-degree network (i.e., changes to the member's first-degree and second-degree connections) since the creation of the materialized view. Such incremental maintenance may additionally be performed in a way that averts or reduces overhead associated with recreating materialized views from query results (e.g., query results 326), eagerly applying individual changes to the materialized views as the changes are made to data in source of truth 334 and/or view store 300, and/or using complex data structures (e.g., inverted indexes, reference counts, etc.) to track the effect of deletions and/or other changes on materialized views 304 (as described in U.S. Pat. No. 9,892,210 (issued 13 Feb. 2018), which is incorporated herein by reference).

As shown in FIG. 3, materialized view store 302 performs on-demand incremental maintenance of materialized views 304 based on requests 322 and/or TTLs 324 for materialized views 304. First, a materialized view is updated "on demand" when the materialized view is required (e.g., after a request for the materialized view is received). Second, the materialized view is updated "incrementally" using changes from view store 300 and/or source of truth 334, after the TTL for the materialized view has expired. Because the materialized view remains unchanged while updates are made to the corresponding data in source of truth 334 and view store 300, up to a period represented by the longer of the TTL's duration and receipt of the next request for the materialized view, data manipulations required to update the materialized view may be reduced. The TTL may also be tuned to control for the staleness of data in materialized view store 302 and/or the frequency with which materialized views 304 are updated.

When a request for data in a materialized view is received after the TTL of the materialized view has expired, materialized view store 302 performs addition-only incremental maintenance of the materialized view. In addition-only incremental maintenance, the materialized view is updated only with additions 336 to the corresponding data since the creation of the materialized view. Instead of using inverted indexes, reference counts, and/or other data structures to track and apply additions 336 and/or deletions from view store 300 to multiple affected materialized views 304, materialized view store 302 triggers a recreation (i.e., recreations 332) of a materialized view whenever any data materialized in the materialized view has been deleted in source of truth 334 and/or view store 300.

To determine if materialized views 304 are affected by deletions to the corresponding data in source of truth 334 and view store 300, materialized view store 302 maintains recent deletions applied to source of truth 334 and/or view store 300 in a delete history 340. For example, materialized view store 302 may receive deletions of nodes 316, edges 318, predicates 320, and/or other data in source of truth 334 from CDC pipeline 306 and store the deletions in a fixed-size, in-memory circular buffer representing delete history 340. When a materialized view with an expired TTL is requested, materialized view store 302 validates the materialized view against deletions in delete history 340 by iterating over delete events in delete history 340 and comparing the delete events with data in the materialized view. If a delete event pertains to a node, edge, predicate, and/or other data in the materialized view, materialized view store 302 recreates the materialized view using one or more queries 308 of view store 300.

Because delete history 340 stores a finite quantity of deletions, a materialized view may be older than the oldest delete event in delete history 340. As a result, materialized view store 302 also triggers recreation of the materialized view when delete history 340 lacks sufficient information to determine if the materialized view is impacted by a delete event (i.e., when the materialized view is older than delete history 340). The size of delete history 340 may also be selected to store a certain time range of delete events (e.g., a number of days or weeks).

While recreations 332 of materialized views 304 based on deletions in delete history 340 may incur some overhead, this overhead may be lower than the overhead associated with individually tracking and applying delete events to multiple materialized views 304. For example, the probability P that a member's second-degree connections do not involve any deletions may be represented by:

$$P \approx \frac{\binom{T-n}{k}}{\binom{T}{k}} = \frac{(T-n)!(T-k)!}{T!(T-n-k)!}$$

In the above representation, T represents a total number of edges 318 in graph 210, n represents the number of second-degree connections in the member's network, and k represents the number of delete events. In a typical graph 210 representing a social network, T>>n, T>>k, and T−n>>k. As a result, incremental maintenance of materialized views 304 can efficiently be used with recreations 332 triggered by delete events in delete history 340 when the average number of edges in materialized views 304 and/or the frequency of deletions in graph 210 is relatively low. In addition, TTLs 324 for materialized views 304 may be lowered to reduce the number of delete events to iterate over and/or store in delete history 340.

If a materialized view is not affected by deletions in delete history 340 and is younger than delete history 340, materialized view store 302 performs incremental maintenance of the materialized view by applying any additions 336 to data materialized in the materialized view since the materialized view was created. For example, materialized view store 302 may query view store 300 for additions 336 to the data since a start time (e.g., start times 338) associated with creation of the materialized view. View store 300 may respond to the query with one or more nodes 316, edges 318, predicates 320, and/or other types of data, and materialized view store 302 may merge the returned data into the materialized view. Materialized view store 302 may then return the updated materialized view in response to a previous query containing a request for the materialized view.

To further reduce overhead associated with maintaining and updating materialized views 304, materialized view store 302 and/or view store 300 may obtain additions 336 to materialized views 304 using a limited number of lightweight queries 308 instead of complex, join-based queries in multiply replicated distributed data stores (e.g., view store 300). For example, a query for an nth degree network of a member {m} at time t may be represented by $\text{conn}^n(\{m\}, t)$. In turn, $\Delta \text{conn}^n(\{m\}, t_i, t_j)$ may represent a query for changes to the member's nth degree connections from time $t_i$ to time $t_j$. When n=1, the first query is a lookup query, and the second query is a lookup and range query. Because neither query involves a join, both queries can efficiently be processed in an in-memory key-value store such as view store 300.

Continuing with the example, a member's second-degree network may be calculated by performing union operations on the first-degree connections of the member with the first-degree connections of the member's first-degree connections:

$$\text{conn}^2(\{m\},t)\text{conn}^1(\text{conn}^1(\{m\},t),t)$$

Additions 336 to the member's second-degree connections from time $t_i$ to time $t_j$ may thus be expressed as:

$$\Delta conn^2(\{m\}, t_i, t_j) = \Delta conn^1(\Delta conn^1(\{m\}, t_i), t_i, t_j) \cup$$
$$conn^1(\Delta conn^1(\{m\}, t_i), t_j, t_i) \cup \Delta conn^1(\Delta conn^1(\{m\}, t_i, t_j), t_i, t_j)$$

with:

$$\text{conn}^1(\{m\},t_j) = \text{conn}^1(\{m\},t_i) \cup (\Delta\text{conn}^1(\{m\},t_i,t_j))$$

In turn, additions 336 to the member's second-degree connections may also be expressed as:

$$\Delta\text{conn}^2(\{m\},t_i,t_j) = \Delta\text{conn}^1(\Delta\text{conn}^1(\{m\},t_i),t_i,t_j)$$
$$\cup \text{conn}^1(\Delta\text{conn}^1(\{m\},t_i,t_j),t_j)$$

Consequently, additions 336 to the member's second-degree connections may be obtained using four lookup-based queries 308 of view store 300. One or more union operations may then be used to combine additions 336 with existing data in a materialized view of the member's second-degree connections to incrementally update the materialized view.

The above equation may be generalized to calculate changes to the nth degree connections of the member (where n>1) from the (n−1)th degree connections using the following:

$$\Delta\text{conn}^n(\{m\},t_i,t_j) = \Delta\text{conn}^1(\Delta\text{conn}^{n-1}(\{_m\},t_i),t_i,t_j)$$
$$\cup \text{conn}^1(\Delta\text{conn}^{n-1}(\{m\},t_i,t_j),t_j)$$

The equation may also be generalized and/or used to calculate other nth degree relations, such as other alumni from the same school as the member (e.g., member to school to member connections) and/or colleagues that work at the same company as the member (e.g., member to company to member connections).

Those skilled in the art will appreciate that creation of an eventually consistent materialized view from one or more instances of an eventually consistent view store 300 may result in consistency issues during subsequent update of the materialized view from data in view store 300. For example, a materialized view in materialized view store 302 may be created and/or updated using data returned by one or more instances of view store 302. If any instance of view store 300 is not consistent with source of truth 334 when the materialized view is created, the materialized view may also be inconsistent with data from source of truth 334. On the other hand, a conventional strong consistency technique that maintains consistency across source of truth 334, view store 300, and materialized view store 302 may significantly degrade performance by requiring blocking of read queries 308 until source of truth 334, view store 300, and materialized view store 302 are consistent with one another.

In one or more embodiments, materialized view store 302 includes functionality to manage and/or enforce eventual consistency of materialized views 304 without blocking queries 308 and/or using locks to update view store 300 and/or materialized view store 302. When an incremental update is to be applied to a materialized view, materialized view store 302 identifies a start time (e.g., start times 338) associated with the incremental update. Next, materialized view store 302 requests, from view store 300, additions 336 to data materialized in the materialized view from the start time to the current time. Materialized view store 302 then updates the materialized view with the received additions 336.

In one or more embodiments, start times 338 associated with incremental updates to materialized views 304 are selected to account for eventual consistency lag between source of truth 334 and view store 300 and/or between view store 300 and materialized view store 302. First, start times 338 may be represented by CDC offsets from CDC pipeline 306. For example, view store 300 and/or materialized view store 302 may identify and/or track the latest CDC offset used to create and/or incrementally update a materialized view. During a subsequent incremental update to the materialized view, a start time for retrieving additions 336 associated with the materialized view may be represented by a CDC offset that is immediately after the latest CDC offset used to create and/or incrementally update the materialized view. Alternatively, the start time may be represented by a time that is determined from the CDC offset, as provided by source of truth 334 and/or CDC pipeline 306. In turn, view store 300 may return additions 336 to the data materialized in the materialized view that have occurred on after the identified CDC offset and/or time.

Start times 338 may also, or instead, be determined by applying a fixed or variable time buffer to the creation times of materialized views 304. For example, a start time for fetching additions 336 to a materialized view may be represented by $C \cdot t - t_{buffer}$, where $C \cdot t$ represents the creation time t of a materialized view (i.e., cache) C and $t_{buffer}$ represents the time buffer. The time buffer may be selected to be greater than a maximum eventual consistency delay associated with propagating data from source of truth 334 to view store 300 and/or materialized view store 302. In turn, the maximum eventual consistency delay may be determined by engineers, operators, and/or a service-level agreement (SLA) associated with source of truth 334 and/or view store 300. As a result, additions 336 may include all changes that are applicable to the materialized view, including changes that were not replicated from source of truth 334 to view store 300 at the time at which the materialized view was created from data in view store 300.

When CDC pipeline 306 experiences an abnormal delay that exceeds the maximum eventual consistency delay, view store 300 and/or materialized view store 302 may perform a selective purge of materialized views 304 to improve recovery times and query-processing performance. For example, materialized view store 302 may identify all materialized views 304 that were created before the abnormal delay and trigger recreations 332 of the identified materialized views. On the other hand, materialized view store 302 may retain materialized views 304 that were created after the end of the abnormal delay because those materialized view are unaffected by any consistency issues caused by the delay.

By performing on-demand, incremental updates of additions 336 to materialized views 304, the system of FIG. 3 reduces overhead associated with regularly recreating materialized views 304; eagerly applying incremental updates as the updates are made to source of truth 334 and/or view store 300; and/or using reference counts, inverted indexes, and/or other complex data structures to map additions and/or deletions to materialized views 304. At the same time, the selection of start times 338 for retrieving additions 336 in the incremental updates may avert consistency issues associated with multiple levels of eventual consistency (e.g., from source of truth 334 to view store 300 and from view store 300 to materialized view store 302). Consequently, the system of FIG. 3 may improve the performance and efficiency of technologies for processing queries of data stores, updating the data stores, and/or providing eventual consistency across distributed data stores.

Those skilled in the art will appreciate that the system of FIG. 3 may be implemented in a variety of ways. As mentioned above, multiple instances of view store 300 and/or materialized view store 302 may be used to process queries from other components or services and/or provide caching of second-degree networks that is used during processing of the queries. Along the same lines, source of truth 334, view store 300, and materialized view store 302 may be provided by a single physical machine, multiple computer systems, one or more virtual machines, a grid, a number of clusters, one or more databases, one or more filesystems, and/or a cloud computing system. Components of view store 300 and/or materialized view store 302 (e.g., index 314, log 312, materialized views 304, delete history 340, etc.) may additionally be implemented or generated together and/or separately by one or more software components and/or layers.

Those skilled in the art will also appreciate that the system of FIG. 3 may be adapted to other types of functionality. For example, operations related to incremental maintenance of materialized views 304 and/or maintaining eventual consistency across source of truth 334, view store 300, and/or materialized view store 302 may be used with other types of queries, data, and/or data stores.

Figure 4:
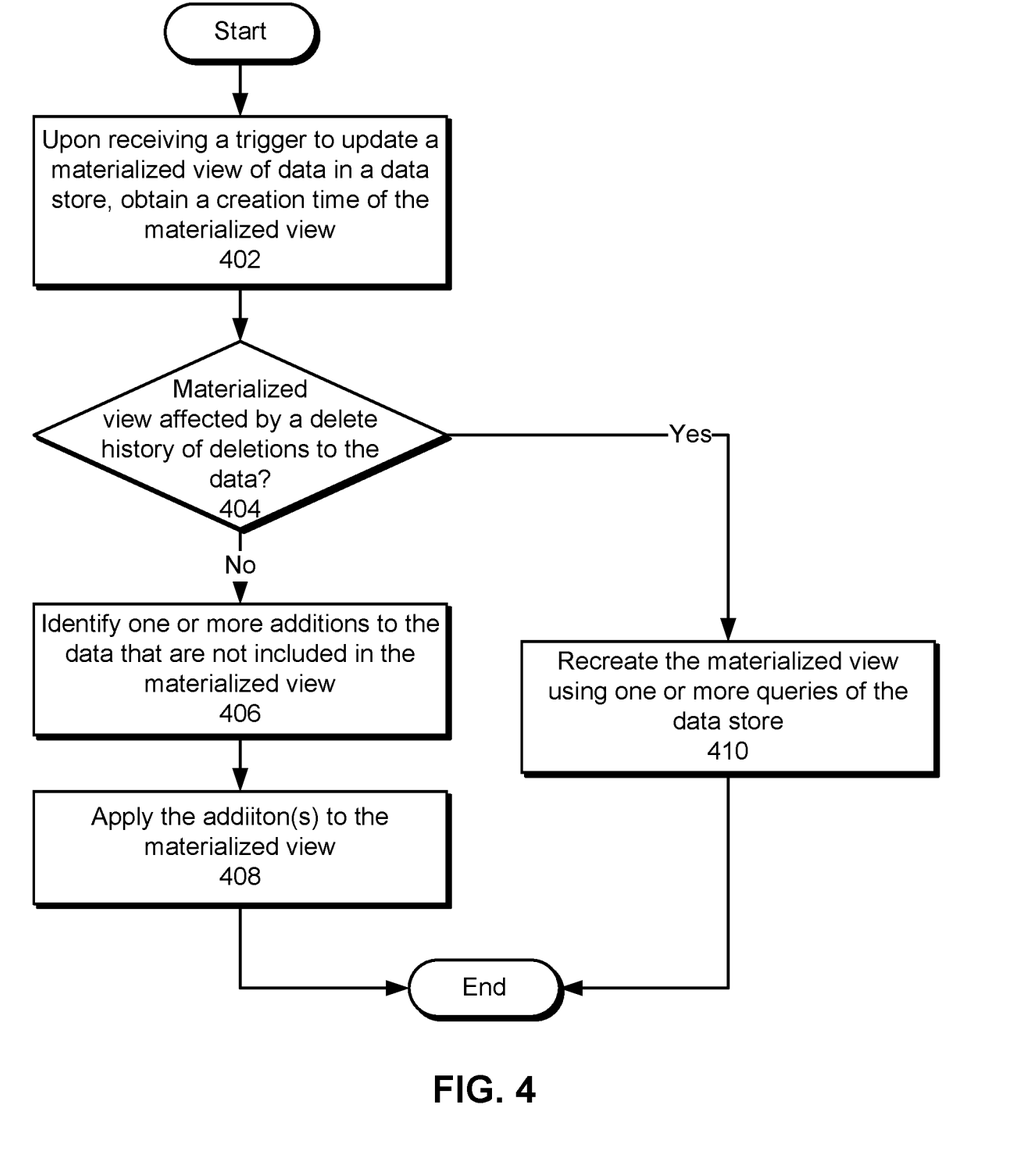
FIG. 4 shows a flowchart illustrating a process of managing a materialized view of data in a data store in accordance with the disclosed embodiments.

FIG. 4 shows a flowchart illustrating a process of managing a materialized view of data in a data store in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a creation time of the materialized view of data in the data store is obtained upon receiving a trigger to update the materialized view (operation 402). For example, the trigger may be generated in response to a request for data in the materialized view and/or after the TTL of the materialized view has lapsed. In turn, the creation time may be obtained as a timestamp, offset, and/or other representation of the latest update to the materialized view.

Next, the creation time is used to determine whether the materialized view is affected or unaffected by a delete history of deletions to the data (operation 404). For example, the creation time may be compared to a time range spanned by deletions in the delete history. If the materialized view was created before the oldest deletion in the delete history, the materialized view may be identified as affected by the delete history. In another example, the creation time may be used to obtain, from the delete history, one or more delete events received after the materialized view was created. If any of the delete events include data found in the materialized view, the materialized view may be identified as affected by the delete history.

When the materialized view is identified as affected by the delete history (e.g., older than the delete history or containing data that was deleted according to the delete history), the materialized view is recreated using one or more queries of the data store (operation 410). For example, the materialized view may include a second-degree network of a member in a social network. As a result, the materialized view may be recreated by providing a key associated with the materialized view (e.g., an identifier for the member) in a first query of first-degree connections of nodes in a graph database and including keys from the result of the first query (e.g., identifiers for the member's first-degree connections) in a second query of the first-degree connections.

When the materialized view is neither affected by deletions in the delete history nor older than the delete history, addition-only incremental maintenance of the materialized view is performed to generate a substantially up-to-date materialized view of the data. First, one or more additions to the data set that are not included in the materialized view are identified (operation 406). For example, the data store may be queried for changes to the data set since a start time associated with creation of the materialized view, as described in further detail below with respect to FIG. 5. As with queries used to recreate a materialized view, the queries may include one or more keys associated with the materialized view. In turn, additions to the data since the creation of the materialized view may be obtained in responses to the queries.

After the additions are obtained, the additions are applied to the materialized view (operation 408). For example, data in the additions may be merged (e.g., unioned) with existing data in the materialized view to update the materialized view. In turn, the updated materialized view may be returned in response to a request for data in the materialized view.

Figure 5:
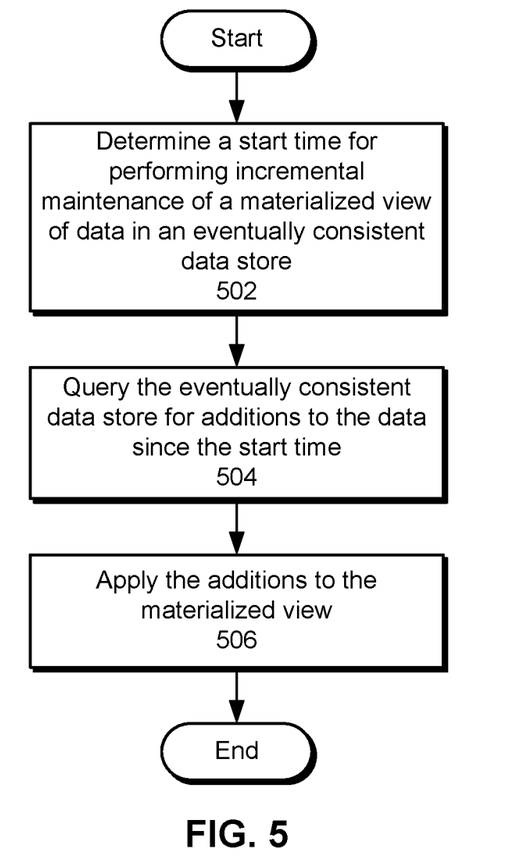
FIG. 5 shows a flowchart illustrating a process of maintaining consistency between a materialized view and an eventually consistent data store in accordance with the disclosed embodiments.

FIG. 5 shows a flowchart illustrating a process of maintaining consistency between a materialized view and an eventually consistent data store in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a start time for performing incremental maintenance of a materialized view of data in the eventually consistent data store is determined (operation 502). The start time may be based on an eventual consistency attribute associated with the materialized view. For example, the start time may include and/or be generated from a CDC offset associated with the latest update to the materialized view. In another example, the start time may be determined by applying a time buffer to a creation time of the materialized view. The time buffer may represent and/or be greater than a maximum eventual consistency delay associated with eventual consistency between the materialized view and the eventually consistent data store.

Next, the eventually consistent data store is queried for additions to the data since the start time (operation 504). For example, the eventually consistent data store may be queried for additions that have been applied to the data since the start time. Finally, the additions are applied to the materialized view (operation 506) to produce an up-to-date representation of the materialized view.

Figure 6:
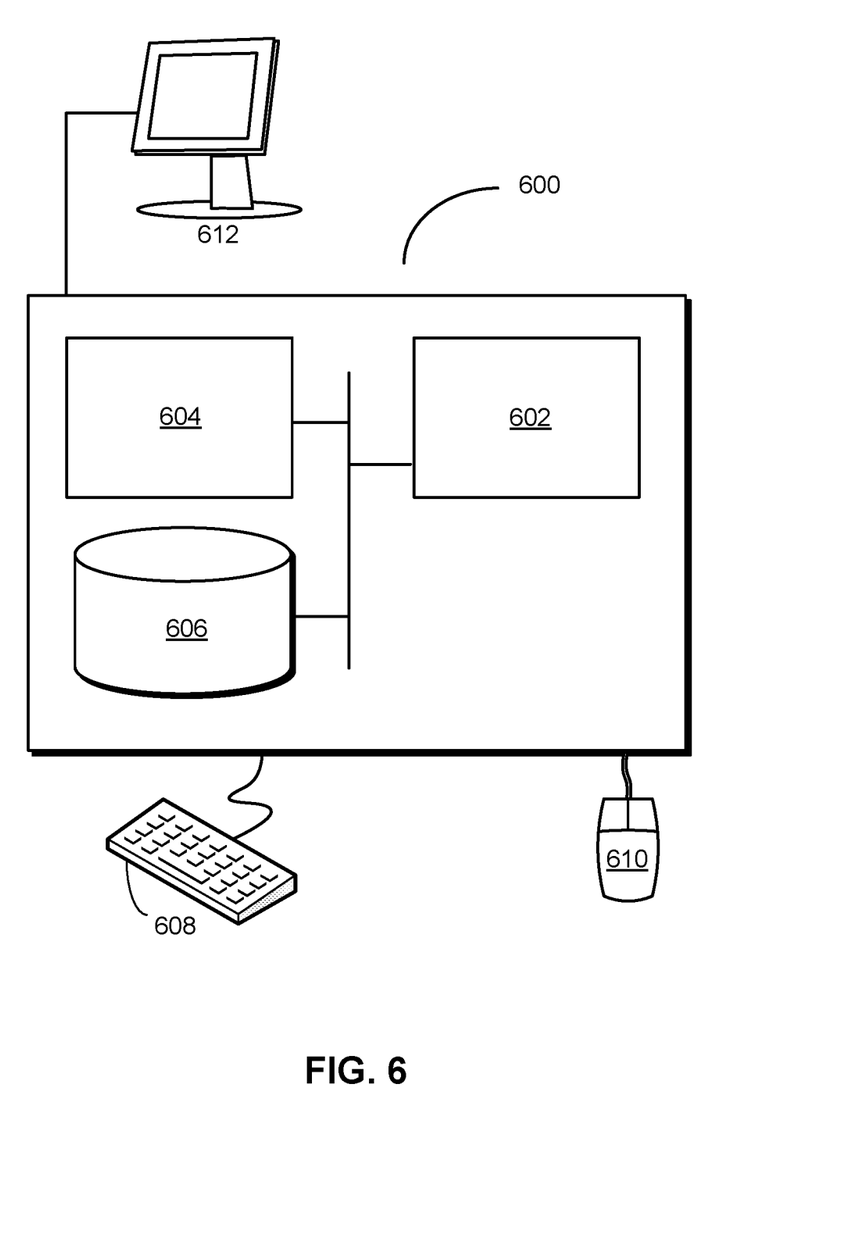
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for managing materialized views in an eventually consistent data store. The system includes one or more data stores, such as a view store and/or a materialized view store. The materialized view store obtains a creation time of a materialized view of data in another data store (e.g., the view store). Next, the materialized view store verifies that the materialized view is not affected by deletions applied to the data since the creation time. The materialized view store and/or view store then identify one or more additions to the data that are not included in the materialized view. Finally, the materialized view store applies the additions to the materialized view to maintain an eventual consistency of the materialized view with the data store.

The materialized view store may also, or instead, obtain a materialized view of data in an eventually consistent data store, such as the view store. Next, the materialized view store determines a start time for performing incremental maintenance of the materialized view. The start time may be determined based on an eventual consistency attribute associated with the materialized view. The materialized view store then queries the eventually consistent data store for one or more additions to the data since the start time. Finally, the materialized view store applies the additions to the materialized view to maintain an eventual consistency of the materialized view with the eventually consistent data store.

In addition, one or more components of computer system 600 may be remotely located and connected to the other components over a network. Portions of the present embodiments (e.g., source of truth, view store, materialized view store, graph database, etc.) may also be located on different nodes of a distributed system that implements the embodiments. For example, the present embodiments may be implemented using a cloud computing system that manages and updates materialized views in one or more remote materialized view stores.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a first creation time of a first materialized view of data in a data store;
determining whether the first materialized view is affected by deletions applied to the data since the first creation time;
in response to determining, by one or more computer system, that the first materialized view is not affected by deletions applied to the data since the first creation time;
identifying, by the one or more computer systems, one or more additions to the data that are not included in the first materialized view; and
applying, by the one or more computer systems, the one or more additions to the first materialized view to maintain an eventual consistency of the first materialized view with the data store;
obtaining a second creation time of a second materialized view of second data in the data store;
determining whether the second materialized view is affected by deletions applied to the second data since the second creation time;
in response to determining that the second materialized view is affected by deletions applied to the second data since the second creation time, recreating the second materialized view using one or more queries of the data store.

2. The method of claim 1, wherein the one or more queries comprise:
a first query of first-degree connections of a node in a graph database; and
a second query of first-degree connections of a result of the first query.

3. The method of claim 1, further comprising:
when a third creation time of a third materialized view of the data is older than a delete history comprising the deletions, recreating the third materialized view using one or more second queries of the data store.

4. The method of claim 1, wherein determining that the first materialized view is not affected by deletions applied to the data comprises:
determining that the deletions are not applied to any data in the first materialized view.

5. The method of claim 1, wherein identifying the one or more additions to the data comprises:
transmitting, to the data store, a query comprising a key associated with the first materialized view; and
obtaining, from the data store, the one or more additions to the data in a response to the query.

6. The method of claim 5, wherein querying the data store for the one or more additions to the data comprises:
querying an eventually consistent data store for additions to the data since a change data capture (CDC) offset associated with creation of the first materialized view.

7. The method of claim 5, wherein querying the data store for the one or more additions to the data comprises:
querying an eventually consistent data store for additions to the data since a time represented by a time buffer applied to the first creation time.

8. The method of claim 7, wherein the time buffer comprises a maximum eventual consistency delay associated with maintaining the eventual consistency between the first materialized view and the eventually consistent data store.

9. The method of claim 1, further comprising:
receiving a trigger to update the first materialized view prior to determining that the data in the first materialized view is not affected by the deletions applied to the data.

10. The method of claim 9, wherein the trigger is generated after at least one of:
a request for the data in the first materialized view is received; and
a time to live (TTL) of the first materialized view has lapsed.

11. The method of claim 1, wherein the first materialized view comprises a select-project-join (SPJ) view.

12. The method of claim 1, wherein the data store comprises a graph database.

13. A method, comprising:
obtaining a first materialized view of data in an eventually consistent data store;
determining, by a computer system, a start time for performing incremental maintenance of the first materialized view, wherein the start time is based on an eventual consistency attribute associated with the first materialized view;
querying the eventually consistent data store for one or more additions to the data since the start time; and
applying, by the computer system, the one or more additions to the first materialized view to maintain an eventual consistency of the first materialized view with the eventually consistent data store:
when a second materialized view of the data is affected by deletions applied to the eventually consistent data store since a second creation time of the second materialized view, recreating the second materialized view from one or more queries of the eventually consistent data store.

14. The method of claim 13, wherein determining the start time associated with incremental maintenance of the first materialized view comprises:
setting the start time to a time represented by a change data capture (CDC) offset associated with creation of the first materialized view.

15. The method of claim 13, wherein determining the start time associated with incremental maintenance of the first materialized view comprises:
applying a time buffer to a creation time of the first materialized view to obtain the start time.

16. The method of claim 15, wherein the time buffer is greater than a maximum eventual consistency delay associated with maintaining eventual consistency between the first materialized view and the eventually consistent data store.

17. The method of claim 13, wherein the first materialized view comprises a select-project-join (SPJ) view of the eventually consistent data store.

18. A non-transitory computer-readable storage medium storing instructions that when executed by a computer cause the computer to perform a method, the method comprising:
obtaining a first creation time of a first materialized view of data in a data store;

determining whether the first materialized view is affected by deletions applied to the data since the first creation time;
in response to determining that the first materialized view is not affected by deletions applied to the data since the first creation time:
  identifying one or more additions to the data that are not included in the first materialized view; and
  applying the one or more additions to the first materialized view to maintain an eventual consistency of the first materialized view with the data store;
obtaining a second creation time of a second materialized view of second data in the data store;
determining whether the second materialized view is affected by deletions applied to the second data since the second creation time;
in response to determining that the second materialized view is affected by deletions applied to the second data since the second creation time, recreating the second materialized view using one or more queries of the data store.

19. The non-transitory computer-readable storage medium of claim 18, wherein the one or more queries comprise:
  a first query of first-degree connections of a node in a graph database; and
  a second query of first-degree connections of a result of the first query.

20. The non-transitory computer-readable storage medium of claim 18, the method further comprising:
  when a third creation time of a third materialized view of the data is older than a delete history comprising the deletions, recreating the third materialized view using one or more second queries of the data store.

* * * * *